(12) United States Patent
Wu

(10) Patent No.: US 7,993,028 B2
(45) Date of Patent: Aug. 9, 2011

(54) BACKLIGHT MODULE

(75) Inventor: Min-Lun Wu, Miaoli County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 315 days.

(21) Appl. No.: 12/334,534

(22) Filed: Dec. 15, 2008

(65) Prior Publication Data
US 2010/0061085 A1  Mar. 11, 2010

(30) Foreign Application Priority Data
Sep. 5, 2008 (TW) .............................. 97134061 A

(51) Int. Cl.
*F21V 21/26* (2006.01)
(52) U.S. Cl. . 362/269; 362/97.1; 362/97.2; 362/217.14; 362/217.16; 362/614; 362/632; 362/634
(58) Field of Classification Search ................ 362/97.1, 362/97.2, 217.14, 217.16, 269, 614, 632, 362/634
See application file for complete search history.

(56) References Cited

U.S. PATENT DOCUMENTS

| | | | | |
|---|---|---|---|---|
| 7,434,958 B2 * | 10/2008 | Yang et al. | .................... | 362/225 |
| 7,540,649 B2 * | 6/2009 | Satoh et al. | ................... | 362/630 |
| 2005/0141220 A1 * | 6/2005 | Kim et al. | ..................... | 362/240 |
| 2008/0310161 A1 * | 12/2008 | Wu | ............................... | 362/246 |
| 2009/0046445 A1 * | 2/2009 | Namiki et al. | ............... | 362/97.2 |

* cited by examiner

*Primary Examiner* — Diane Lee
*Assistant Examiner* — Mary Zettl
(74) *Attorney, Agent, or Firm* — Winston Hsu; Scott Margo

(57) ABSTRACT

A backlight module includes a case, a lamp, and a lamp clamping mechanism. The case has a bottom plate. The lamp is installed inside the case. The lamp clamping mechanism is connected to the bottom plate. The lamp clamping mechanism includes a base, a second clamping part, and a driving part. A first clamping part is disposed on the base. The second clamping part is installed on the base in a movable manner. The second clamping part is used for clamping the lamp with the first clamping part cooperatively when the second clamping part is moved to a first position so as to fix the lamp on the bottom plate. The driving part is pivotally disposed through the base. The driving part is used for rotating relative to the base so as to push the second clamping part from a second position to the first position on the base.

16 Claims, 10 Drawing Sheets

BACKLIGHT MODULE

BACKGROUND OF THE INVENTION

1. Field of the Invention

The present invention relates to a backlight module, and more specifically, to a backlight module capable of assembling a lamp.

2. Description of the Prior Art

Since liquid crystal molecules do not produce light themselves, a common method for driving an LCD to display images involves utilizing a backlight module to provide light with sufficient brightness and uniform distribution to the LCD so as to make the LCD display corresponding images. Therefore, a backlight module is one of the major components of an LCD. A traditional backlight module uses a cold cathode fluorescent lamp (CCFL) as a light source. Common methods for disposing cold cathode fluorescent lamps in a backlight module are divided into two types: direct-type and edge-type. The said direct-type method involves disposing two or more cold cathode fluorescent lamps in the bottom of a backlight module to increase light intensity of the backlight module. Thus, the direct-type method is suitable for a display panel of high light intensity or large size, such as an LCD monitor or an LCD TV.

As mentioned above, since disposal of a plurality of cold cathode fluorescent lamps in a direct-type backlight module is necessary, an efficient assembly process for the plurality of cold cathode fluorescent lamps should be a concern in structural design of direct-type backlight modules. Please refer to FIG. 1, which is a diagram of a backlight module 10 according to the prior art. The backlight module 10 comprises a bottom board 12, a cold cathode fluorescent lamp 14, and a lamp clamping mechanism 16. A base 18 of the lamp clamping mechanism 16 is installed on the bottom board 12. An end of the base 18 has a clamping part 20. As shown in FIG. 1, the clamping part 20 is a single-claw structure. The clamping part 20 is used for clamping the cold cathode fluorescent lamp 14 so as to fix the cold cathode fluorescent lamp 14 on the base 18. However, the said lamp clamping method makes it time-consuming and strenuous for a user to detach the cold cathode fluorescent lamp 14 from the backlight module 10 when necessary. That is to say, when the cold cathode fluorescent lamp 14 has to be replaced, a user needs to detach other optical films (such as a diffuser, a prism film, a brightness enhancement film, and so on) above the lamp clamping mechanism 16 from the backlight module 10 sequentially. Subsequently, the user needs to exert force on the clamping part 20 to release the clamping of the clamping part 20 from the cold cathode fluorescent lamp 14, and then detach the cold cathode fluorescent lamp 14 from the lamp clamping mechanism 16 so that the user may continue to finish the subsequent lamp replacement procedures. Thus, not only may this method cause the said time and energy consumption problems, but also increases the likelihood of damage to the cold cathode fluorescent lamp 14 when the user releases the clamping of the clamping part 20 from the cold cathode fluorescent lamp 14.

SUMMARY OF THE INVENTION

The present invention provides a backlight module comprising a case having a bottom plate; a lamp installed inside the case; and a lamp clamping mechanism connected to the bottom plate of the case, the lamp clamping mechanism comprising a base, a first clamping part disposed on the base; a second clamping part installed on the base in a movable manner for clamping the lamp with the first clamping part cooperatively when the second clamping part is moved to a first position relative to the base so as to fix the lamp on the bottom plate; and a driving part pivotally disposed through the base for rotating relative to the base so as to push the second clamping part from a second position to the first position on the base.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
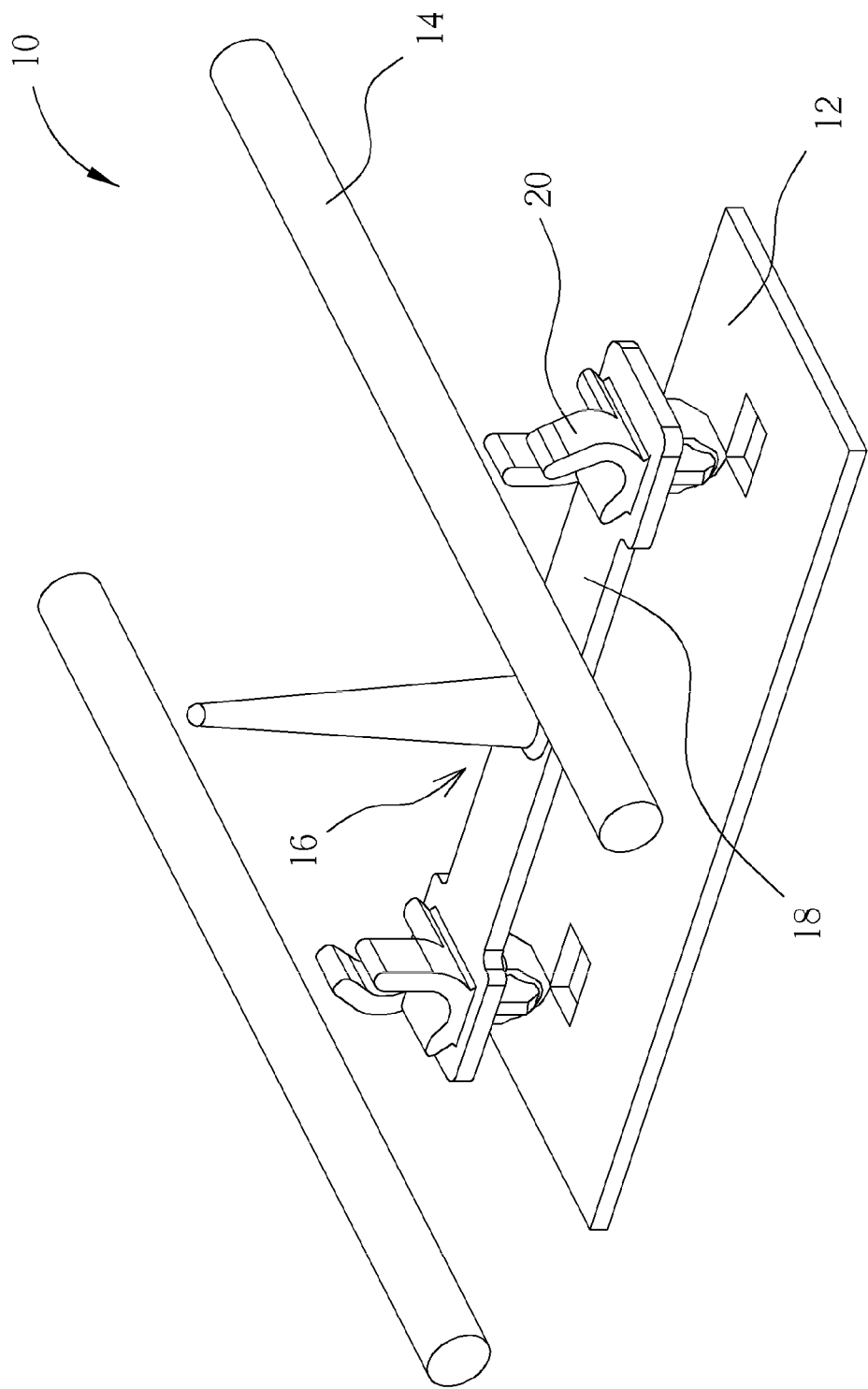
FIG. 1 is a diagram of a backlight module according to the prior art.
Figure 2:
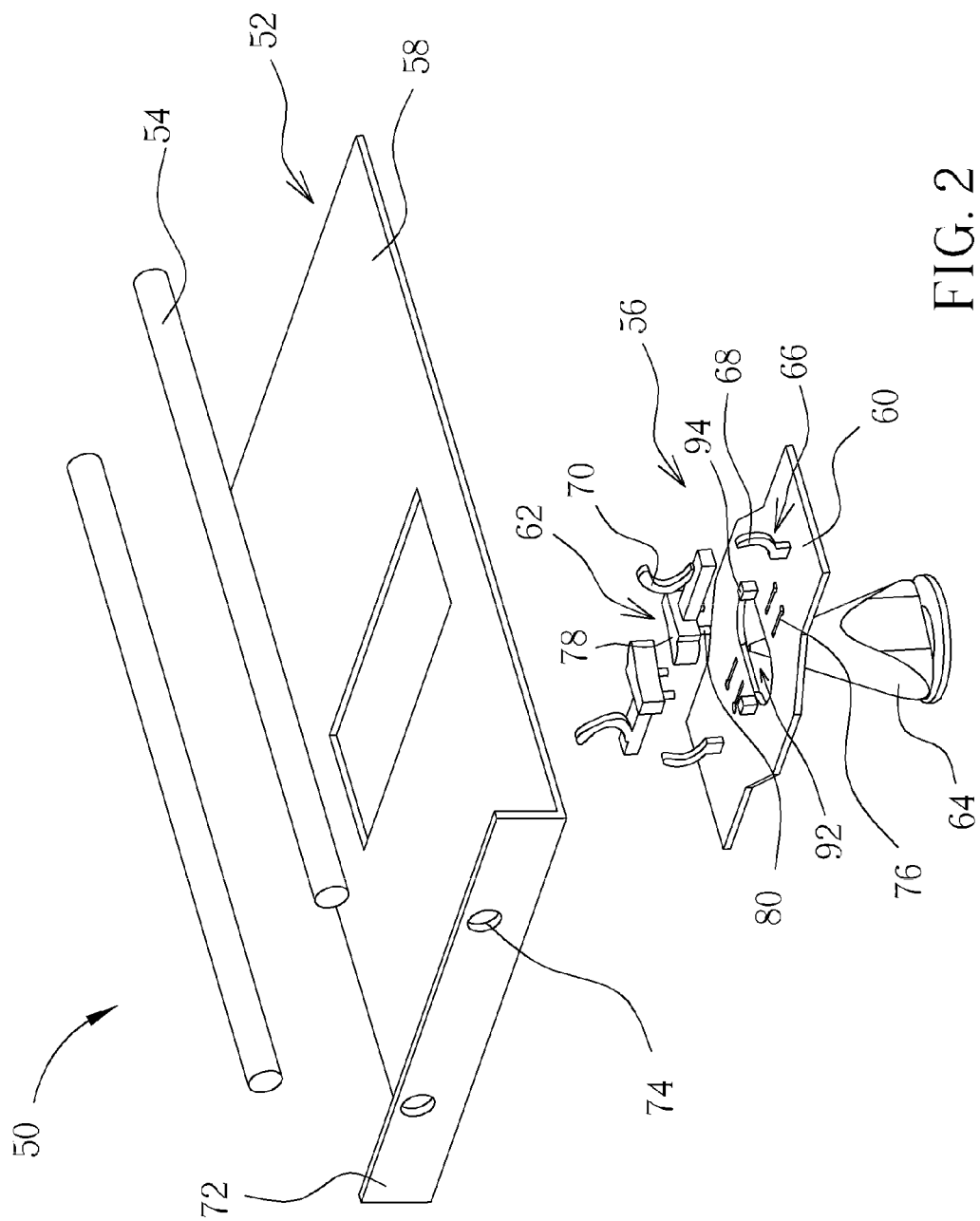
FIG. 2 is an exploded diagram of a backlight module according to the present invention.

Please refer to FIG. 2. FIG. 2 is an exploded diagram of a backlight module 50 according to the present invention. The backlight module 50 comprises a case 52, a lamp 54, and a lamp clamping mechanism 56. The case 52 has a bottom plate 58. The lamp 54 is installed in the case 52. The lamp 54 is a fluorescent lamp, preferably a cold cathode fluorescent lamp. The lamp clamping mechanism 56 is connected to the bottom plate 58. The lamp clamping mechanism 56 comprises a base 60, a second clamping part 62, and a driving part 64. A first clamping part 66 is disposed on the base 60. In this embodiment, the second clamping part 62 is preferably made of flexible reflection material, such as highly-reflective plastic material. The second clamping part 62 is installed on the base 60 in a movable manner. As shown in FIG. 2, the first clamping part 66 has a first claw structure 68. An end of the second clamping part 62 corresponding to the first clamping part 66 has a second claw structure 70. The second claw structure 70 is used for clamping the lamp 54 with the first claw structure 68 cooperatively so as to fix the lamp 54 on the bottom plate 58. The driving part 64 is disposed through the base 60 in a rotatable manner. The driving part 64 is used for rotating relative to the base 60 so as to drive the second clamping part 62 to move on the base 60. Furthermore, the case 52 further comprises a lateral board 72. As shown in FIG. 2, a lamp extraction hole 74 is formed on the lateral board 72 corresponding to the lamp 54. Thus, after the lamp 54 is detached from the lamp clamping mechanism 56, the lamp 54 may be extracted from the lamp extraction hole 74.

Figure 3:
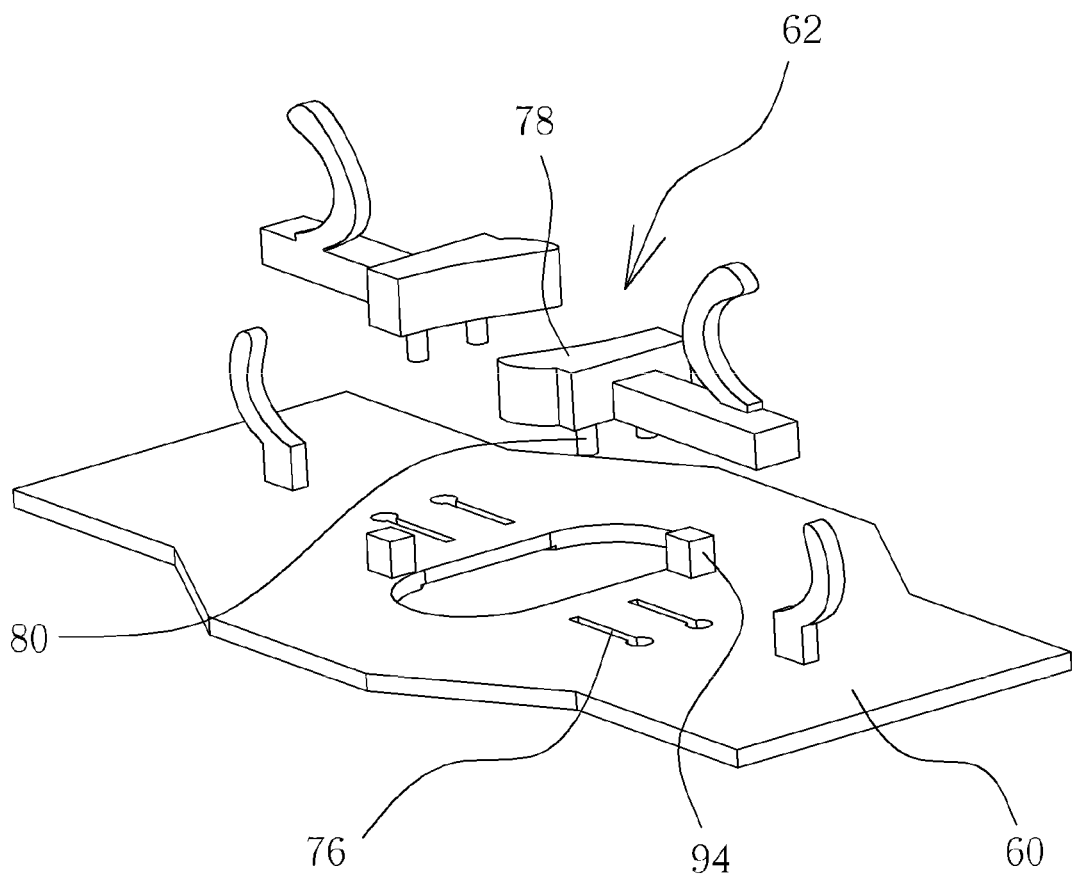
FIG. 3 is an enlarged diagram of the base and the second clamping part in FIG. 2.

More detailed description for the assembly process of the base 60 and the second clamping part 62 and the structure of the driving part 64 is provided as follows. First, please refer to FIG. 3. FIG. 3 is an enlarged diagram of the base 60 and the second clamping part 62 in FIG. 2. As shown in FIG. 3, a guide rail 76 is formed on the base 60. An end of the second clamping part 62 corresponding to the driving part 64 has a slider 78. A guide pin 80 is disposed under the slider 78. The guide pin 80 is used for disposing through the guide rail 76 so as to move along the guide rail 76 when the driving part 64 drives the slider 78 to move. Furthermore, the number of the said assembly of the guide pin and the guide rail is not limited to one, meaning that the number may be increased up to two or more so that the second clamping part 62 may be moved on the base 60 more firmly.

Figure 4:
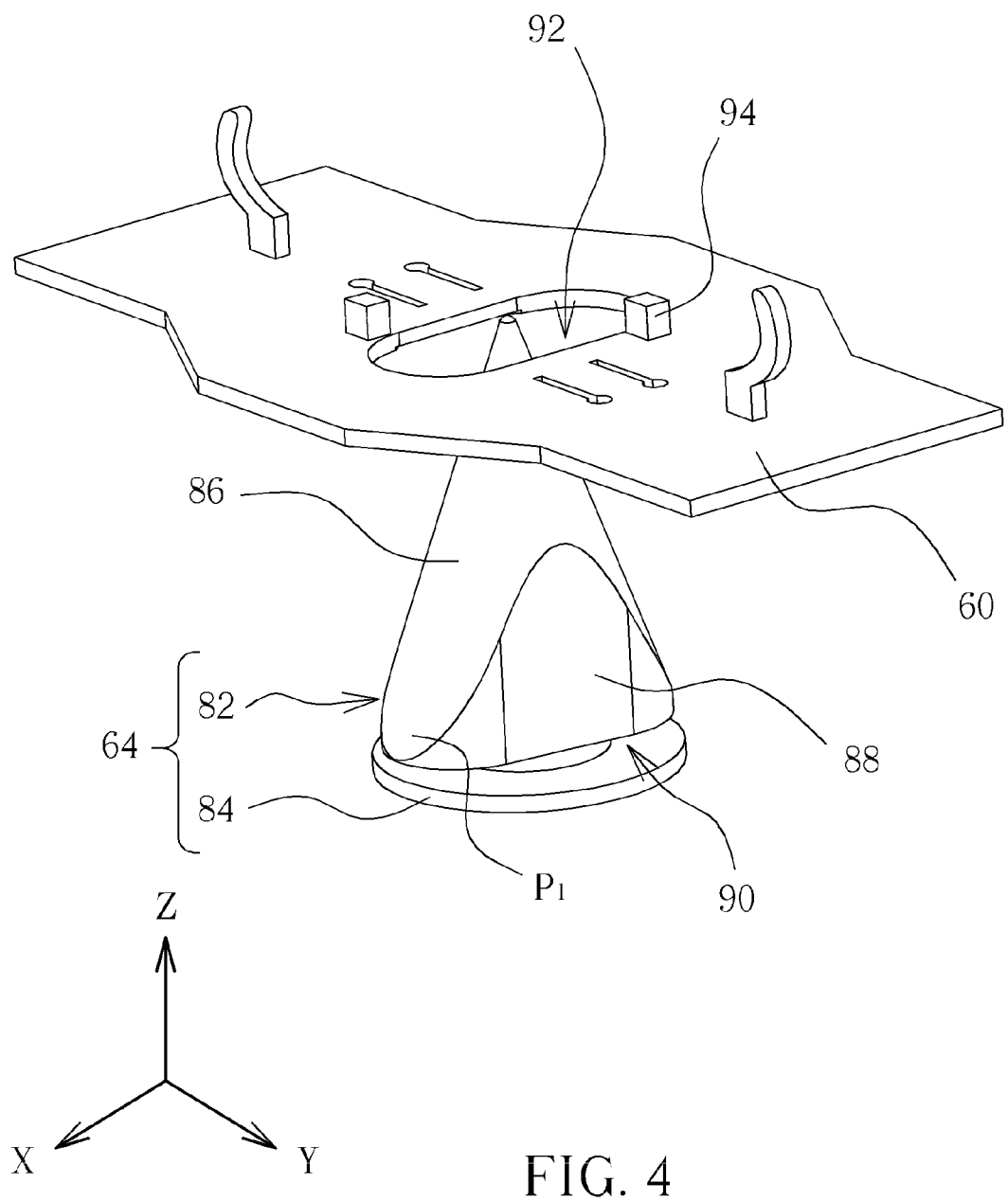
FIG. 4 is an enlarged diagram of the base and the driving part in FIG. 2.

Next, please refer to FIG. 4. FIG. 4 is an enlarged diagram of the base 60 and the driving part 64 in FIG. 2. In this embodiment, the driving part 64 is a spacer pin for supporting other optical films (such as a prism film, a diffuser, and so on) above the lamp 54 in the backlight module 50. As FIG. 4 shows, the driving part 64 is substantially similar to a cone structure. The driving part 64 comprises a taper body 82 and a circular plate 84. A tangent plane 88 is formed on a taper surface 86 of the taper body 82 so that a long-axis end $P_1$ is formed correspondingly on the taper body 82. The tangent plane 88 is substantially parallel to a rotating axis of the taper body 82 (a Z-axis in FIG. 4). The circular plate 84 is connected to the taper body 82. A ring groove 90 is formed between the circular plate 84 and the taper body 82. A hole 92 is formed on the base 60. The base 60 may be engaged with the ring groove 90 after the taper body 82 passes through the hole 92 and rotates through an angle so that the driving part 64 may be disposed through the base 60 in a rotatable manner.

Figure 5:
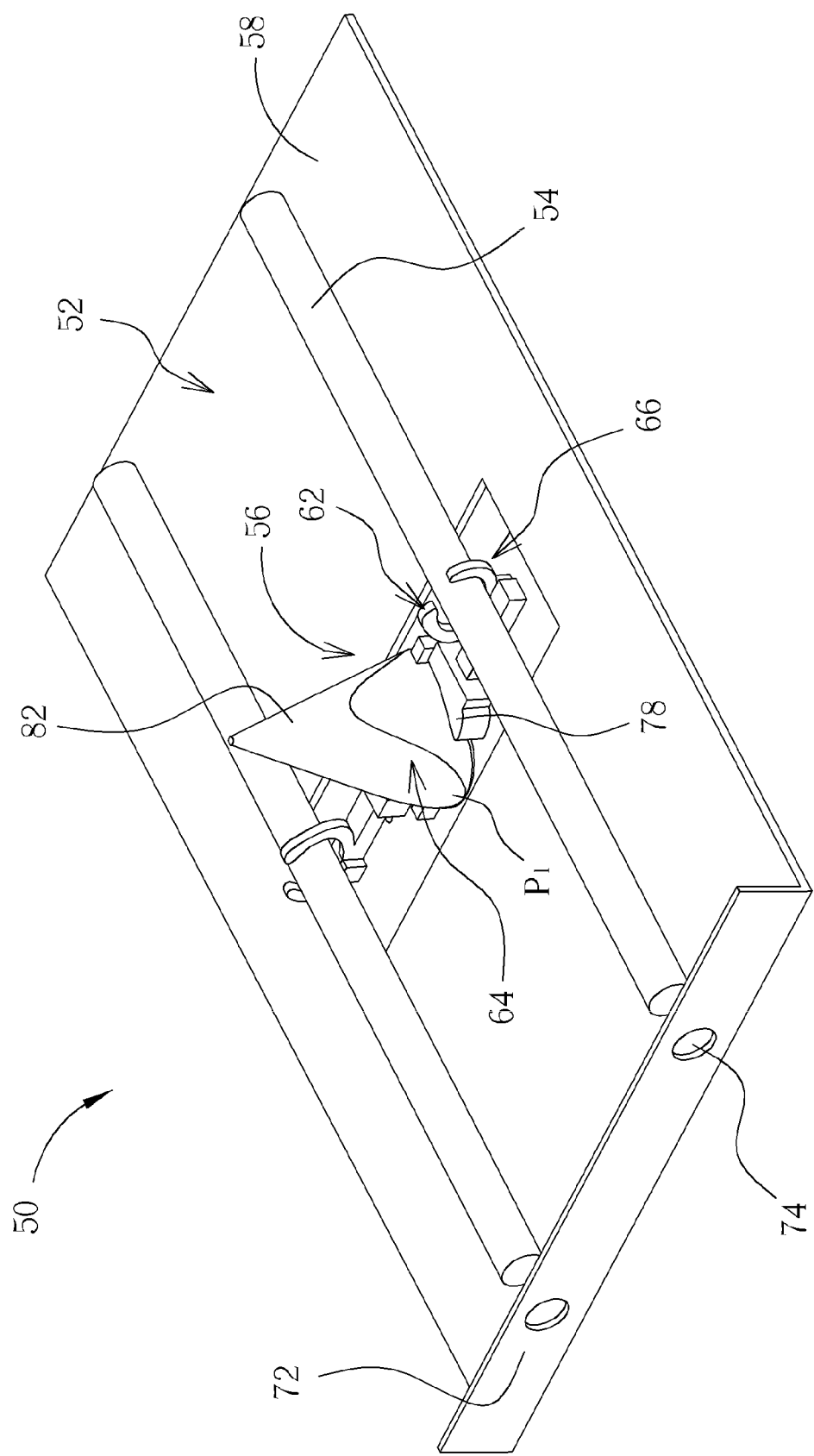
FIG. 5 is a diagram of the second clamping part in FIG. 2 not clamping the lamp with the first clamping part.

More detailed description for assembly and disassembly processes of the backlight module 50 is provided as follows. The assembly process of the backlight module 50 is described first. Please refer to FIG. 2 and FIG. 5 at the same time. FIG. 5 is a diagram of the second clamping part 62 in FIG. 2 not clamping the lamp 54 with the first clamping part 66. When a user wants to assemble the lamp clamping mechanism 56 to the bottom plate 58 of the case 52, the user needs to dispose the guide pin 80 through the guide rail 76 on the base 60 first, and then dispose the driving part 64 through the hole 92 of the base 60. Subsequently, the user joins the base 60 on the bottom plate 58 of the case 52. The base 60 passes through the opening of the bottom plate 58 from the bottom of the bottom plate 58 and reveals most of its surface. Here, the joining of the base 60 and the bottom plate 58 may utilize a common joining method, such as sticking, and so forth; or the base 60 and the bottom plate 58 may be formed monolithically. At this time, the position of the lamp clamping mechanism 56 relative to the lamp 54 and the case 52 is shown in FIG. 5, and the guide pin 80 under the slider 78 of the second clamping part 62 is located at a release position shown in FIG. 6. After the base 60 is jointed with the bottom plate 58 of the case 52, the user may simply rotate the circular plate 84 of the driving part 64 an angle (about 90°) clockwise so that the circular plate 84 may be rotated from a position shown in FIG. 6 to a position shown in FIG. 7. At this time, the position of the lamp clamping mechanism 56 relative to the lamp 54 and the case 52 is shown in FIG. 8. In other words, when the circular plate 84 is rotated from the position shown in FIG. 6 to the position shown in FIG. 7, the long-axis end $P_1$ of the taper body 82 of the driving part 64 may push the slider 78 of the second clamping part 62 for moving the guide pin 80 from the release position shown in FIG. 6 to a lock position shown in FIG. 7 along the guide rail 76. At the same time, the base 60 may be located between the long-axis end $P_1$ and the circular plate 84 so as to be engaged with the ring groove 90 of the driving part 64. Thus, the driving part 64 may be engaged with the base 60, and the second claw structure 70 on the second clamping part 62 may be moved to a position shown in FIG. 8 so that the lamp 54 may be clamped with the first claw structure 68 and the second claw structure 70.

Figure 6:
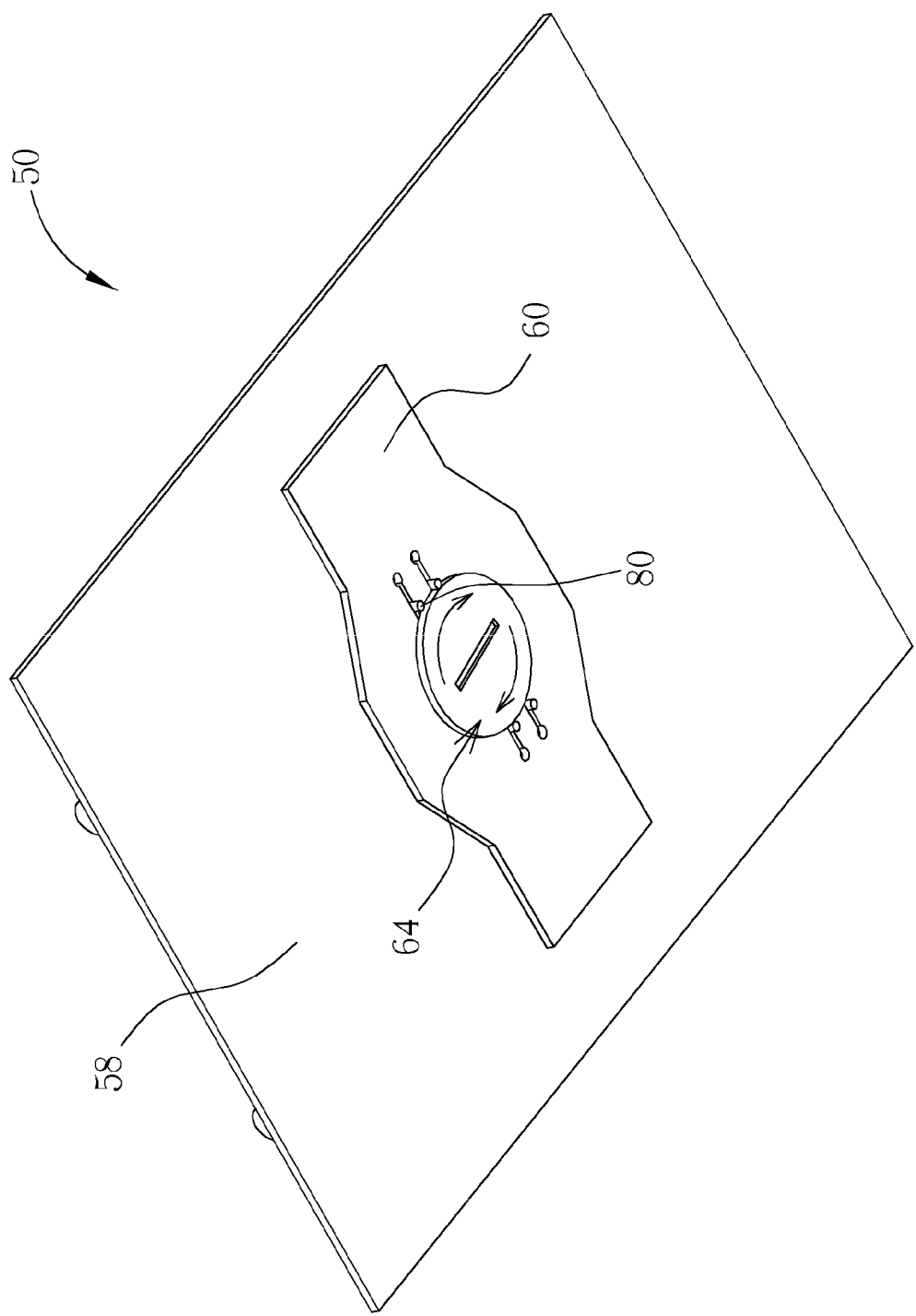
FIG. 6 is a diagram of the guide pin of the second clamping part in FIG. 2 being located at the release position.
Figure 7:
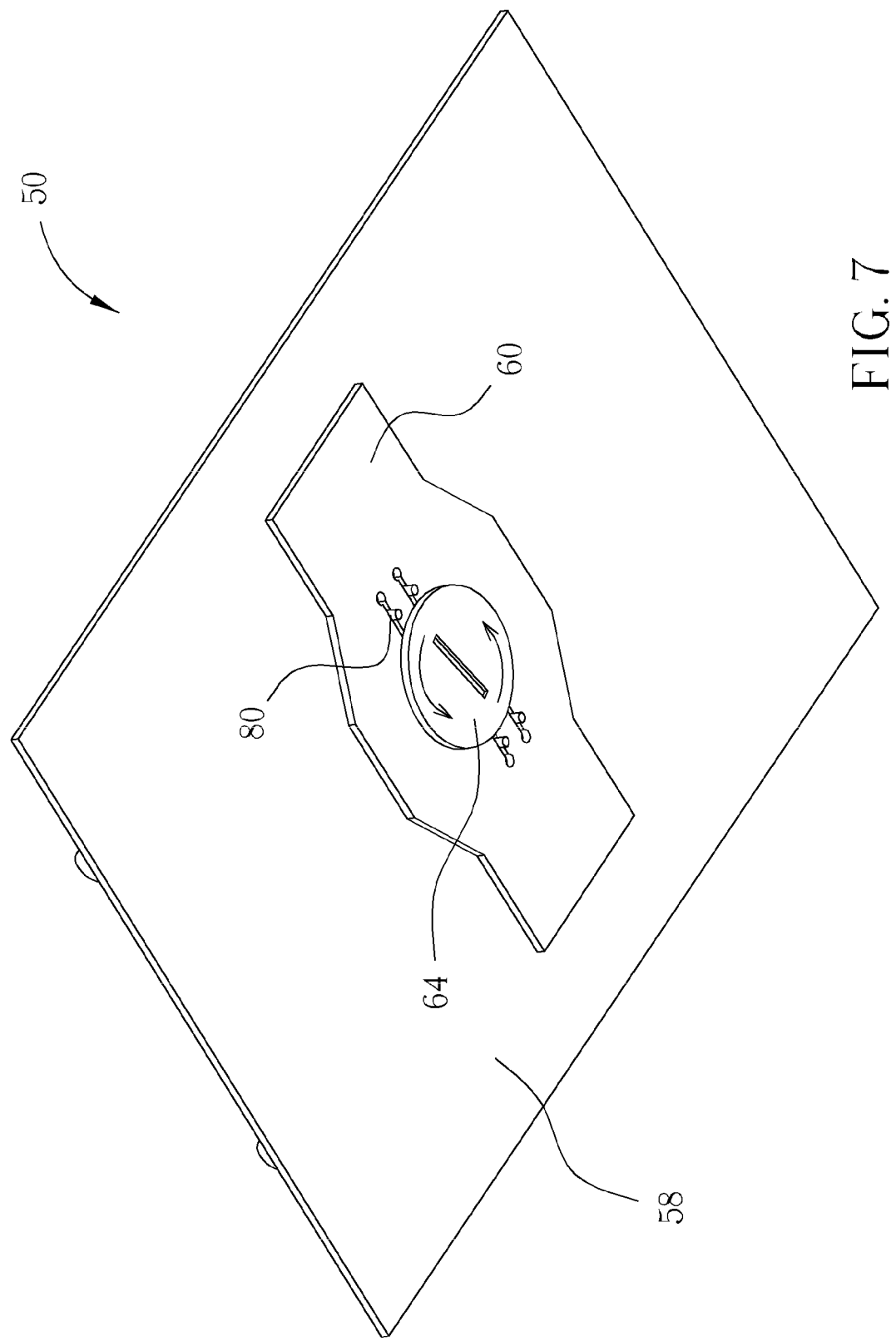
FIG. 7 is a diagram of the guide pin of the second clamping part in FIG. 2 being located at the lock position.
Figure 8:
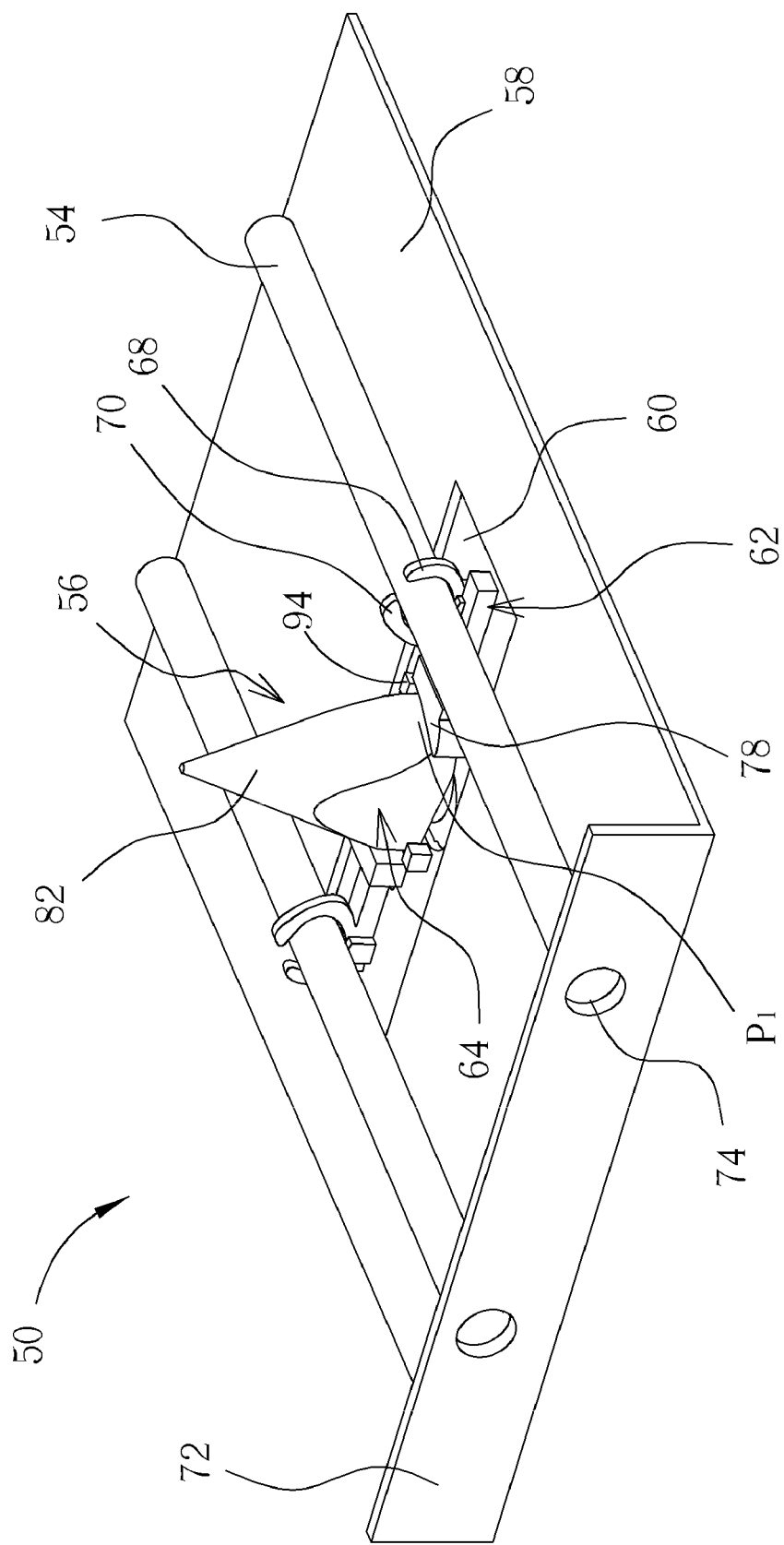
FIG. 8 is a diagram of the second clamping part in FIG. 2 clamping the lamp with the first clamping part cooperatively.

On the other hand, if the user wants to detach the lamp clamping mechanism 56 from the bottom plate 58 of the case 52, the user needs to rotate the circular plate 84 of the driving part 64 an angle (about 90°) counterclockwise from the position shown in FIG. 7 to the position shown in FIG. 6. As a result, the user may extract the driving part 64 from the hole 92 of the base 60 since the base 60 is no longer engaged with the ring groove 90 of the driving part 64, and then pull the guide pin 80 from the lock position to the release position along the guide rail 76 so as to release the lamp 54 from the clamping of the first claw structure 68 and the second claw structure 70. As mentioned above, the lamp extraction hole 74 is formed on the lateral board 72 of the case 52. Therefore, the user may extract the lamp 54 from the lamp extraction hole 74. Finally, the user may detach the base 60 from the bottom plate 58 of the case 52 so as to finish the disassembly process of the backlight module 50. Furthermore, as shown in FIG. 4, a block 94 is formed on the base 60. The block 94 is used for abutting against the long-axis end $P_1$ of the driving part 64 so as to constrain the rotation of the driving part 64 relative to the base 60 when the long-axis end $P_1$ is rotated to the position shown in FIG. 8 relative to the base 60. In such a manner, when the long-axis end $P_1$ of the driving part 64 is rotated to be in contact with the block 94, the user may infer that the second claw structure 70 has been pushed to clamp the lamp 54 cooperatively with the first claw structure 68 by the driving part 64, and then stop rotating the driving part 64.

In summary, the lamp clamping mechanism of the present invention may utilize the assembly of the driving part, the base, and the said adjustable clamping part to achieve the objective of detaching a lamp from the outside of the backlight module, and then utilize the additional lamp extraction design on the lateral board of the case for directly assembling and disassembling the lamp from the outside of the backlight module instead of detaching the said optical films above the lamp from the backlight module sequentially.

Figure 9:
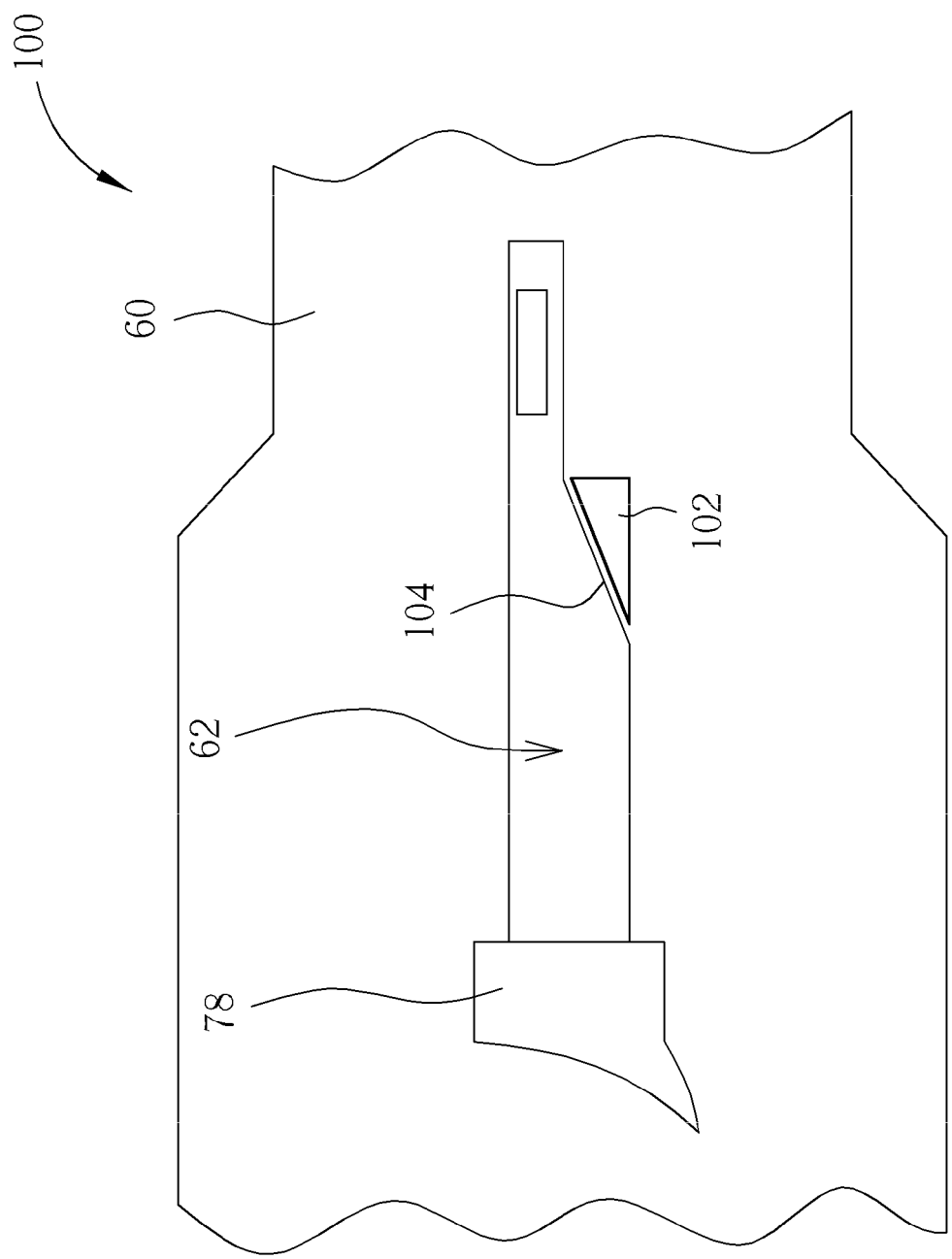
FIG. 9 is a partial top view of the lamp clamping mechanism according to another embodiment of the present invention.
Figure 10:
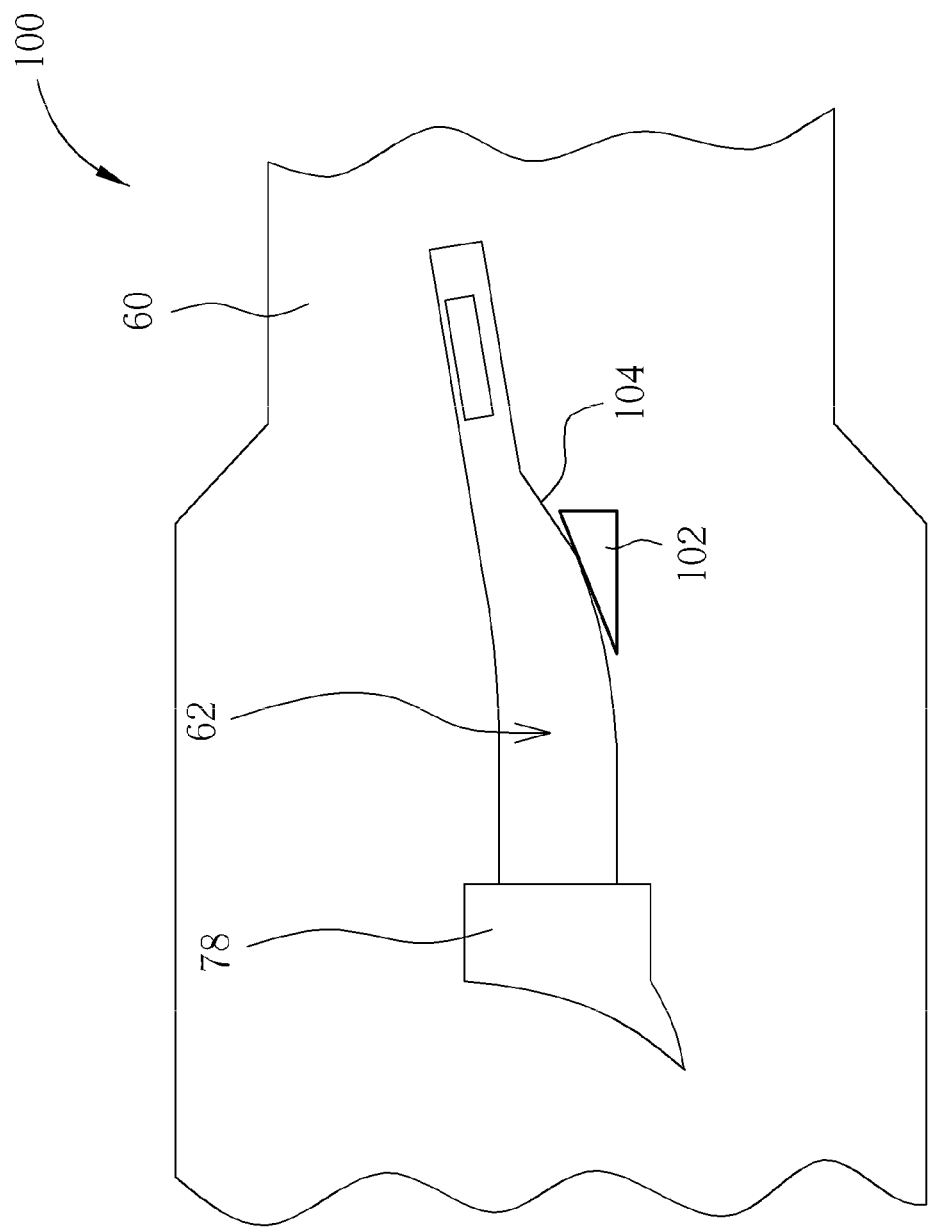
FIG. 10 is a top view showing the elastic deformation of the second clamping part in FIG. 9 relative to the inclined surface structure.

It should be noted that the return design of the guide pin 80 moving from the lock position back to the release position along the guide rail 76 is not limited to the said manual method. For example, please refer to FIG. 9. FIG. 9 is a partial top view of the lamp clamping mechanism 100 according to another embodiment of the present invention. Components mentioned in both embodiments represent components with similar functions or similar positions, and the related description is thereof omitted herein. The difference between the lamp clamping mechanism 100 and the lamp clamping mechanism 56 in FIG. 2 is an inclined surface structure design. As shown in FIG. 9, an inclined surface structure 102 is formed on the base 60, and an inclined cross plane 104 is formed on the second clamping part 62 corresponding to the inclined surface structure 102. The inclined surface structure 102 corresponds to and abuts against the inclined cross plane 104 of the second clamping part 62 when the guide pin 80 of the second clamping part 62 is located at the release position shown in FIG. 6. Subsequently, when the guide pin 80 is moved from the release position in FIG. 6 to the lock position in FIG. 7 along the guide rail 76, the inclined cross plane 104 of the second clamping part 62 may slide along the inclined surface structure 102 so as to result in elastic deformation of the second clamping part 62 shown in FIG. 10 (at this time, the circular plate 84 of the driving part 64 is rotated to the position shown in FIG. 7). Afterwards, if the circular plate 84 of the driving part 64 is rotated the angle (about 90°) counterclockwise from the position in FIG. 7 to the position in FIG. 6, the second clamping part 62 may be driven to move from the position in FIG. 10 back to the position in FIG. 9 by the elastic force generated from the said elastic deformation since the long-axis end $P_1$ of the driving part 64 does not abut against the slider 78 of the second clamping part 62. That is to say, the second clamping part 62 may return to the release position automatically. Other common return designs may also be applied to the said return design for the second clamping part 62, such as utilizing a spring to connect the second clamping part 62 and the base 60 so that the second clamping part 62 may return automatically to the release position via the elastic force provided from the spring. Furthermore, as shown in FIG. 2, the number of the said clamping parts in the aforementioned embodiments may be limited to one set. That is to say, one clamping part mechanism set may be additionally disposed at another end of the base 60 so that a plurality of lamps may be clamped by the lamp clamping mechanism 56 at the same time.

Compared with the prior art utilizing one single claw structure to fixing a lamp in a backlight module, the lamp clamping mechanism according to the present invention may utilize the said linkage mechanism of the driving part and the clamping part for quick assembly and disassembly of the lamp in the backlight module. As mentioned above, the lamp clamping mechanism according to the present invention may not only allow a user to perform the assembly and disassembly processes of the lamp from the outside of the backlight module for preventing the lamp from unnecessary damage, but also speeds up the said processes. Furthermore, the said processes may also be further simplified via an additional lamp extraction design on the lateral board of the case.

Those skilled in the art will readily observe that numerous modifications and alterations of the device and method may be made while retaining the teachings of the invention.

What is claimed is:

1. A backlight module comprising: a case having a bottom plate;
   one or more lamps, installed inside the case, each of the one or more lamps being a linear lamps with a circular cross-section; and
   a lamp clamping mechanism connected to the bottom plate of the case, the lamp clamping mechanism comprising:
   a base, a first clamping part disposed on the base;
   a second clamping part installed on the base in a movable manner for clamping the lamp cooperatively with the first clamping part when the second clamping part is moved to a first position relative to the base for fixing the lamp on the bottom plate; and
   a driving part pivotally disposed through the base for rotating relative to the base to push the second clamping part from a second position to the first position on the base;
   wherein the first clamping part has a first claw structure, an end of the second clamping part relative to the first clamping part has a second claw structure, and the second claw structure is used for clamping the lamp cooperatively with the first claw structure when the second clamping part is moved to the first position.

2. The backlight module of claim 1, wherein a guide rail is formed on the base, an end of the second clamping part corresponding to the driving part has a slider, and a guide pin is disposed under the slider for moving inside the guide rail correspondingly when the driving part drives the slider to move.

3. The backlight module of claim 1, wherein the driving part is a taper-shaped driving part.

4. The backlight module of claim 3, wherein the taper-shaped driving part is substantially similar to a cone structure, a tangent plane is formed on a taper surface of the taper-shaped driving part, and the tangent plane is parallel to a rotating axis of the taper-shaped driving part.

5. The backlight module of claim 1, wherein a long-axis end of the driving part is used for driving the second clamping part to move from the second position to the first position on the base when being rotated a specific angle relative to the base.

6. The backlight module of claim 5, wherein a block is formed on the base for abutting against the long-axis end of the driving part to constrain the rotation of the driving part relative to the base when the long-axis end of the driving part is rotated the specific angle relative to the base.

7. The backlight module of claim 1, wherein the driving part comprises:
   a taper body; and
   a circular plate connected to the taper body, a ring groove formed between the circular plate and the taper body;
   wherein a hole is formed on the base, and the base is used for engaging with the ring groove when the taper body passes through the hole, so that the driving part may be disposed through the base in a rotatable manner.

8. The backlight module of claim 1, wherein the base and the bottom plate are formed monolithically.

9. The backlight module of claim 1, wherein the second clamping part is made of flexible material.

10. The backlight module of claim 9, wherein the second clamping part is made of plastic or rubber material.

11. The backlight module of claim 10, wherein the second clamping part is made of highly-reflective material.

12. The backlight module of claim 9, wherein an inclined surface structure is formed on the base, and an inclined cross plane is formed on the second clamping part corresponding to the inclined surface structure for sliding along the inclined surface structure to result in elastic deformation of the second clamping part when the second clamping part is located at the first position.

13. The backlight module of claim 1, wherein the driving part is a spacer pin.

14. The backlight module of claim 1, wherein the case further comprises a lateral board, a lamp extraction hole formed corresponding to the lamp on the lateral board.

15. The backlight module of claim 1, wherein the lamp is a cold cathode fluorescent lamp.

16. The backlight module of claim 1, wherein the lamp clamping mechanism further comprises a spring connected to the base and the second clamping part for providing an elastic force to the second clamping part to move the second clamping part from the first position to the second position on the base.

* * * * *